United States Patent [19]
Dawson

[11] Patent Number: 4,741,369
[45] Date of Patent: May 3, 1988

[54] INLETTING DEVICE FOR FUEL TANK

[75] Inventor: Gary D. Dawson, Rochester, Mich.

[73] Assignee: Chrysler Motors Corporation, Highland Park, Mich.

[21] Appl. No.: 14,417

[22] Filed: Feb. 12, 1987

[51] Int. Cl.⁴ .............................................. B65B 3/04
[52] U.S. Cl. .................................. 141/286; 141/301; 220/86 R
[58] Field of Search ................ 137/527, 855; 251/149.2, 320; 220/86 R; 141/37–66, 1–12, 285–310, 325–327

[56] References Cited

U.S. PATENT DOCUMENTS 4,625,777 12/1986 Schmidt ............................ 141/286

Primary Examiner—Houston S. Bell, Jr.
Attorney, Agent, or Firm—Kenneth H. MacLean, Jr.

[57] ABSTRACT

In a fill tube of a vehicle fuel tank, an inlet forming device for receiving the nozzle of an associated fuel pump for filling the fuel tank and including an apertured seal member adapted to encircle the fuel nozzle to prevent fuel vapors from escaping therebetween. The device includes at least one vent opening which is normally blocked by an overlying edge portion of the seal member, but which is movable from its overlying position outward to vent fuel tank pressure. The overlying portion of the seal is normally biased to a closed position by the natural resiliency of an adjacent open celled foamed plastic material which also acts as a filter when the overlying edge portion of the seal is moved to a more open vent position.

2 Claims, 1 Drawing Sheet

INLETTING DEVICE FOR FUEL TANK

BACKGROUND OF THE INVENTION

The subject application is a fuel inletting apparatus for the inlet tube of a fuel tank to permit filling the fuel tank with fuel while simultaneously sealing the entrance from escape of fuel vapors. A number of prior devices and systems have been utilized to prevent the escape of displaced air and fuel vapor from a fuel tank during the fill operation. U.S. Pat. No. 2,545,233 to Kaufman discloses a fuel filling nozzle of a gas pump adapted to seal the entrance of an inlet pipe of a tank. Likewise, the U.S. Pat. No. 2,778,390 to Young discloses an end pipe fitting for an oil tank or the like to fill the oil tank and seal the connection between the nozzle and the end fitting. Similarly, the U.S. Pat. No. 3,259,154 to Scherer discloses an inlet portion of a fuel tank adapted to seal about the nozzle of a fill apparatus. U.S. Pat. No. 3,734,149 to Hansel also discloses a sealing type entrance for a fuel tank. Likewise, U.S. Pat. No. 3,814,147 to Lindberg discloses a similar sealing apparatus. In U.S. Pat. No. 4,232,715 to Pyle, a seal arrangement is disclosed about the nozzle of a gas pump for use in association with a fuel inlet of a vehicle fuel tank. Likewise, in U.S. Pat. No. 4,598,741 to Johnson, a sealing means is provided in the inlet portion of a fuel tank for co-acting with a nozzle to prevent escape of fuel vapor. In addition, this patent discloses a system for storing the air and fuel vapor displaced by liquid fuel during a fill operation for subsequent burning in the vehicle's associated internal combustion engine.

SUMMARY OF THE INVENTION

The subject apparatus in the inlet of the fuel tank has an object of sealing against the nozzle to prevent substantial discharge of vapors from the fuel tank during a fill operation, in addition to providing a novel apparatus for emergency venting of tank pressure utilizing an open celled foamed type plastic material both as a filter member and as a yieldable closing member for a vent valve.

Other advantageous features and objects of the subject invention will be more readily understood after a reading of the following detailed description in which a preferred embodiment is illustrated.

IN THE DRAWINGS

DETAILED DESCRIPTION OF A PREFERRED EMBODIMENT

Figure 1:
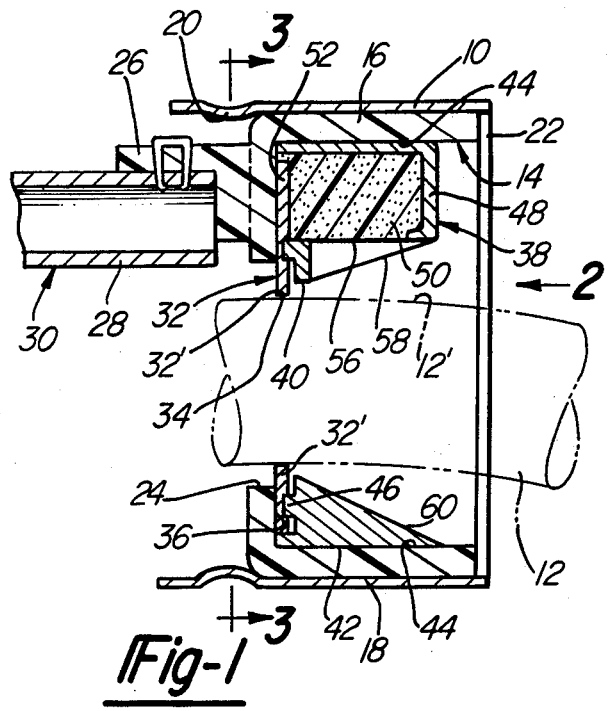
FIG. 1 is a side elevational and sectioned view of the inlet portion of a filler tube for a vehicle fuel tank.
Figure 2:
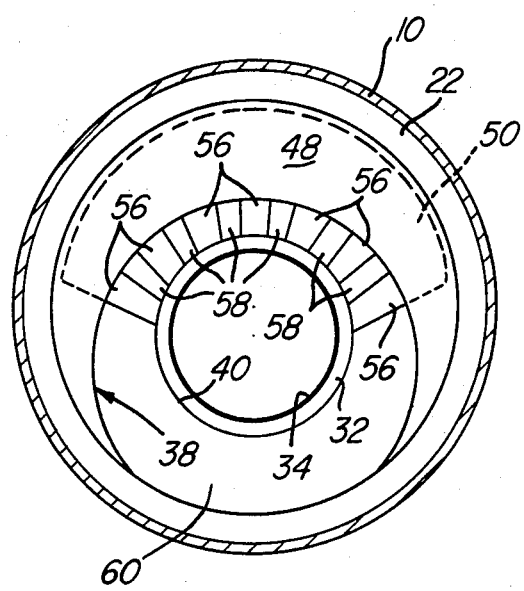
FIG. 2 is an end view of the filler portion of the fuel tank shown in FIG. 1 and looking in the direction of arrow 2 therein.
Figure 3:
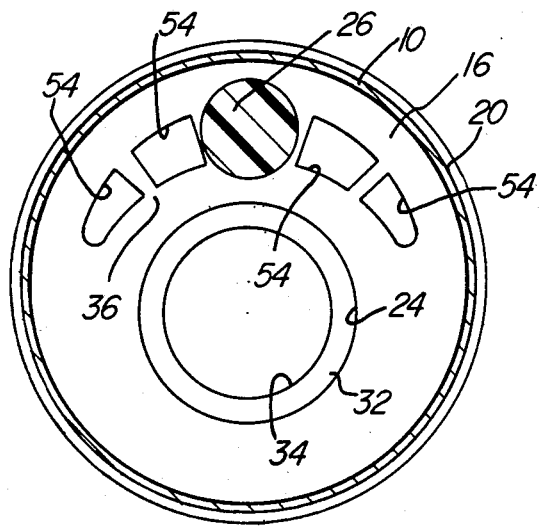
FIG. 3 is a sectioned view taken along section line 3—3 in FIG. 1 and looking in the direction of the arrows.

In FIGS. 1–3, the exterior end 10 of a fuel tank filler tube is illustrated. The exterior end is the inlet receiving end of a vehicle fuel tank adapted to receive the fill nozzle 12 of a fuel pump commonly found at the gas station. Specifically, the fill nozzle 12 is engaged by an inlet forming device or member 14 which is closely interfitted in the end portion 10 of the fuel inlet tube. Specifically, the inletting device 14 is defined by a body 16 having an outer cylindrical surface 18 which is adapted to be press fit within the inner diameter of the end 10. A radially inwardly recessed channel 20 is formed in the filler tube end 10 to limit the distance which the housing 16 can be inserted into the end 10. The end surface 22 of housing 16 is utilized for this insertion process.

Figure 1A:
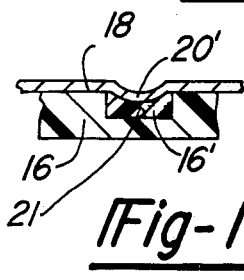
FIG. 1a is a partial view of the filler tube and inlet structure like FIG. 1, but showing a means of sealing between components.

In FIG. 1a, the surface 18 of body 16 of device 14 is sealed with respect to the end portion 10 by providing an elastomeric seal member 16' in an annular groove 21 of the body 16. Further, an annularly formed channel 20' is impressed against the member 16' to produce a particularly good leak resistant sealing means.

As best shown in FIGS. 1–3, the inside face of the housing 10 includes a central aperture forming surface 24. Also, upward from the aperture 24 is an inwardly protruding boss 26 adapted to support an end 28 of a fuel tank fuel conduit 30 for routing fuel to the automatic shut-off port of the fill nozzle 12 (note the opening between the end 28 of conduit 30 and the boss 26). The tube 30 extends through the fuel tank filler tube and then to the desired fill level of the fuel tank. When the fuel entering the fuel tank approaches a filled condition, fuel is forced through the tube 30 to the vicinity of the nozzle 12. This causes the automatic cut-off mechanism in the associated fill nozzle of the gas station to shut off fuel flow.

As previously described, it is desired to inhibit the escape of fuel vapor when the fuel tank is filled with fuel. The subject inlet forming device or member is adapted to be utilized with a system to capture and store the displaced atmosphere or vapor in the fuel tank as the liquid fuel fills the tank. To prevent the escape of vapor past the nozzle 12, an apertured seal member 32 is supported across the aperture 24 of the housing 16. Specifically, the seal member 32 has an aperture forming surface 34 with a dimension or diameter conforming to the outer surface 12' of the fill nozzle 12. The aperture conforming surface 34 fairly tightly grasps the outer surface 12' to prevent fuel vapor leakage therebetween.

As best shown in FIGS. 1 and 2, the seal member 32 is secured to the surface 36 of the housing 16 by means of a combination retainer and filter housing member 38. The member 38 is a substantially ring shaped member having an inner opening 40 providing access for the nozzle 12 to the seal aperture 34. The member 38 has a substantially cylindrical outer surface 42 which is closely engaged by a similarly dimensioned cylindrical surface 44 of the housing body 16. The seal 32 is held against the surface 36 of housing 16 at an annular location about the aperture 24 by means of a circular rim portion 46 formed of member 38. The member 38 and, specifically, its outer surface 42 is tightly slideingly engaged into the housing 16 and specifically the cylindrical surface 44 thereof. The member 38 is thus positioned within the housing 16 so that the rim portion 46 is embedded in the seal member 32, thus holding the seal member tightly against surface 36 while allowing an inner edge portion 32' of the seal to be free for slight movement relative to the housing 16 so as to accommodate irregularities in the nozzle 12.

The combination retainer and filter housing member 38 also includes a generally crescent shaped hollow housing portion 48. The portion 48 defines an interior which is adapted to encircle an open cell type foamed plastic filter 50. This open cell material is permeable to vapors such as air and fuel vapor, as well as being slightly compressible. The portion 48 of the housing and retainer member 38, as well as the filter material 50, overlies a crescent shaped outer edge portion 52 of the seal member 32. The resilient nature of the filter material 50 tends to urge the edge portion 52 of seal 32 against the surface 36 of the housing 16.

Figure 4:
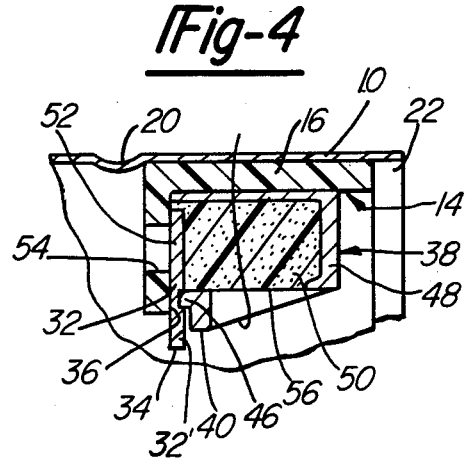
FIG. 4 is a fragmentary and sectioned view of the assembly shown in FIG. 3 taken along section 4—4 in FIG. 3 and looking in the direction of the arrows.
Figure 5:
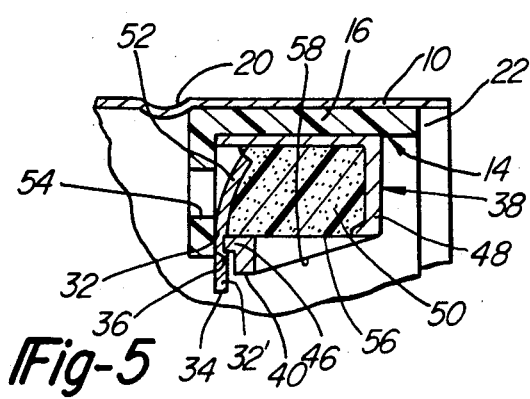
FIG. 5 is a view similar to FIG. 4, but showing the pressure relief valve in an open relief position.

In FIGS. 3 and 4, details of the filter 50 and housing portion 38 are illustrated. Specifically, the surface forming portion 36 of the housing 16 is apertured by a plurality of ports 54 which extend through the housing from the interior of the filler tube 10 to the seal's outer edge portion 52 which is adjacent the filter material 50. This arrangement provides the capacity of venting fuel tank pressure through the filter material 50 by means of moving the edge portion 52 of the seal 32 outward against the natural resiliency of the filter material as shown in FIG. 5. As previously indicated, a system is utilized in association with the subject inlet forming device to accommodate and store the displaced air and fuel vapor when the fuel tank is filled. However, the subject device prevents limited venting of the fuel tank in the event that the aforesaid system does not relieve pressure sufficiently in the tank. When the pressure in a tank again falls below the pressure needed to move the edge portion 52 to the position shown in FIG. 5., the resiliency of the filter material 50 will return the edge portion 50 in sealing relation to the surface 36 of the housing 16, thus blocking the ports 54.

The fuel laden air passing through filter material 50 exits the filter material through face 56 thereof. As shown in FIGS. 1 and 2, the face 56 is exposed to atmosphere through apertures located between spaced ramp portions with inclined surfaces 58 of the member 38. Likewise, the lower portion of member 38 has a ramp portion with an inclined surface 60. Both inclined surfaces 58 and 60 facilitate the insertion and guiding of the nozzle 12 through the apertured seal member 32.

Although only embodiment of the subject inletting device for fuel tanks has been described in detail, modifications may be made thereto which still fall within the scope of the following claims which define the invention.

I claim:

1. A fuel fill tube of a fuel tank having an inlet forming end portion therein with a device to receive a liquid fuel delivery nozzle and to hinder the discharge of vaporous fuel from the tank, comprising:

the device having a housing with a peripheral surface configuration conforming to the shape of the fuel fill tube so that the device is securely held therein and does not permit flow of fuel or vapor therebetween;

the housing encircling a liquid fill inlet opening adapted to receive the associated delivery nozzle for fuel during a fill operation of the fuel tank;

a flexible elastomeric seal member having a generally centrally located aperture therethrough and supported near the inner edge portion forming the central aperture whereby the dimensional configuration of the aperture conforms to the shape of the associated delivery nozzle so that fuel and vapor will not pass therebetween;

at least one vent opening through the housing located radially outward from the central aperture of the seal member, an outer edge portion of the seal member overlying the vent opening to normally block flow from the fuel tank to the atmosphere;

filter means of compressible open celled foamed plastic material supported and positioned in abutting engagement with the outer surface of the seal's peripheral edge portion thereby normally urging the edge portion against the housing and over the vent opening, but permitting the seal's edge portion to move away from the vent opening by slight compression of the filter material in response to greater pressure within the fuel tank than atmosphere.

2. In the inlet portion of the fill tube for a fuel tank, an inlet receiving assembly for a fuel filling nozzle for entry of fuel into the fuel tank without discharge of fuel vapors therefrom except when tank vapor pressure substantially exceeds atmospheric pressure, comprising:

a first housing with a peripheral surface configuration conforming to the configuration of the inlet portion of the fill tube so that the housing is insertably supported therein without passage of fuel vapor therebetween;

the first housing encircling an inlet aperture for the associated fuel pump nozzle utilized during a filling operation of the fuel tank;

a seal member of elastomeric material having a generally centrally located aperture therethrough for closely receiving the associated fuel nozzle to prevent passage of fuel and vapor therebetween during a fill operation;

a combination seal retainer and filter housing member supported by the housing and with a seal engaging portion slightly outward from the generally centrally located aperture thereof to secure the seal member to the housing while permitting an inner edge portion of the seal member to flexibly engage the outer surface of the associated fuel nozzle during the fill operation thereby blocking passage of fuel and vapor therebetween;

the first housing having at least one vent opening in bypass relation to the centrally apertured seal member and with the opening positioned radially outward therefrom;

a portion of the peripheral edge of the seal member overlying the vent opening and arranged so that pressure in the tank tends to move the edge portion away from the vent opening for releasing tank pressure;

a filter means including a hollow housing and filter material of open celled foamed plastic material overlying the peripheral edge portion of the seal member and tending to urge the edge portion against the vent opening, but being sufficiently resilient to allow the seal's edge portion to move outward from the opening to vent fuel tank pressure.

* * * * *